United States Patent Office 2,874,028
Patented Feb. 17, 1959

2,874,028

METHOD OF PRODUCING NATURAL RHOMBIC SHAPED AMMONIUM SULPHATE CRYSTALS

George C. Ponchaud, Gary, Ind., assignor to United States Steel Corporation, a corporation of New Jersey No Drawing. Application April 25, 1956
Serial No. 580,452

3 Claims. (Cl. 23—119)

This invention relates to a process for recovering ammonia in the form of ammonium sulphate. More particularly it is directed to an improved crystallizer process for producing a more coarse and granular product of ammonium sulphate in which the crystals have an improved shape and an increased size compared to those produced by conventional processes.

When ammonium sulphate is crystallized from a pure solution the crystals obtained are rhombic in shape and this is considered to be their natural form. In the conventional and commercial saturator practices of producing ammonium sulphate by introducing ammonia bearing gas into contact with a dilute solution of sulphuric acid, impurities in the solution, principally iron, are known to prevent the growth of the crystals into their natural rhombic shape. These impurities cause the crystals to grow into long slender needles having a ratio of length to diameter of about 15:1. These long needles are fragile and break up in processing to form a very fine salt containing much dust. Such a salt is very prone to cake and presents serious storing and marketing problems. The desirability of a more coarse and granular product has been recognized and several proposals have been advanced for the purpose of obtaining larger crystals.

I have discovered that the addition of tannin to the saturator bath in the conventional and commercial practices mentioned above will result in a more coarse and granular final product. The tannin in the saturator bath causes the ammonium sulphate crystals to grow in their natural rhombic shape to a much larger and more uniform size such that they do not break in processing. In addition, the resulting salt is much less prone to cake.

Noticeable improvements in the size and shape of ammonium sulphate crystals are obtained in accordance with the principles of this invention by the addition of only small amounts of tannin, in the nature of a trace, to the saturator bath. In this respect, an addition of tannin providing a concentration in a saturator bath of about .001 percent was found to result in the production of a coarse and granular ammonium sulphate product in which practically all of the crystals had the desired size and the natural rhombic shape. Improved results were obtained by the addition of smaller amounts of tannin in that smaller portions of the crystals in the resulting product had the desired size and rhombic shape but the addition of amounts greater than .001 percent did not develop further noticeable improvements. Accordingly, it will be understood that additions providing a tannin concentration of at least .001 percent represent the preferred practice of the invention. These tannin percentages refer to a production practice using a saturator holding an acid bath of approximately 4000 gallons of an ammonium sulphate saturated aqueous solution or mother liquor containing on the average 5.0 percent sulphuric acid and about 45 percent ammonium sulphate.

As indicated above, the practice of this invention is effected in a saturator apparatus for the recovery of ammonia which being conventionally constructed need not be illustrated or described in detail. As a typical example and application of the principles of the invention, it will be sufficient to indicate that a saturator apparatus was used which contained about 4000 gallons of a 6 percent aqueous solution of sulphuric acid at a temperature of 50° C. and into which coke-oven gas at a temperature of 55° C. was blown as a fine stream. Before initiating the admission of coke-oven gas, tannin in an amount to be described was added to the solution. The introduction of coke-oven gas together with the continuous addition of sulphuric acid required to maintain its concentration formed a mother liquor or saturated solution of ammonium sulphate in the acid bath. Continued introduction of the ammonia bearing coke-oven gas resulted in the precipitation of ammonium sulphate on the bottom of the saturator. This precipitated salt was then recovered conventionally by delivery through siphon ejectors to draining tables and thence to centrifugal dryers. The mother liquor and waste water recovered in the drying operations were returned to the saturator bath by pumping through a seal pot together with such make-up water, tannin, and sulphuric acid as was required to maintain the composition of the bath. The recovered crystals of ammonium sulphate were large in size and rhombic in shape and the resulting dried ammonium sulphate was free flowing and had a coarse granular appearance.

The example given above is concerned with a saturator of conventional design known in the industry as a "cracker-pipe" saturator. Since the action of tannin in promoting crystal growth has to do with the surface energy of crystal faces this phenomena is not limited to any particular mechanical system. It involves only the formation of crystals from the mother liquor and the means by which this is accomplished has no bearing on this action. The addition of tannin is applicable to spray type saturators and systems involving other types of crystallizers and evaporators.

As further indicated above, the addition of tannin in an amount providing a concentration of at least .001 percent represents the preferred practice of the invention. In the above example, this is accomplished by the addition of 150 grams of tannin to a bath of 4000 gallons and with this addition almost all of the crystals were rhombic in shape and large in size. Smaller additions of tannin yielded smaller quantities of the rhombic crystals. An addition of 100 grams of tannin gave a yield of about 30% of this type of crystal while a tannin addition of 50 grams gave a yield of 10%. While additions larger than 150 grams did not produce an improved yield, the addition of 750 grams or .005 percent tannin to the bath is preferred since the excess is not harmful and offsets the amount lost by hydrolysis to gallic acid and/or glucose and the amount lost by being carried out with the salt. This loss by hydrolysis takes place slowly and requires periodic additions for replacement purposes. Additions of 15 grams of tannin at twenty-four hour intervals were found sufficient to maintain the tannin concentration required for crystal growth of the character described.

The tannin referred to in the above examples was a commercial grade of tannin such as is supplied for boiler water treatment. Laboratory tests indicated that it was derived from Quebracho wood. It is a colloidal substance which does not go into solution but is suspended in the bath as discrete particles submicroscopic in size and electrically charged. When these particles are hydrolyzed to gallic acid they lose their colloidal structure and go into normal molecular solution. Gallic acid and/or glucose are not active in promoting the growth of ammonium sulphate crystals in the process under consideration.

Although the process of this invention has been described in terms of its preferred modification, it is to be understood that changes may be made within the scope of the following claims.

I claim:

1. A continuous process for producing crystals of ammonium sulphate which comprises continuously introducing ammonia and sulphuric acid into a saturated solution of ammonium sulphate, adding tannin to said solution in an amount sufficient to cause the production of ammonium sulphate crystals having a natural rhombic shape, and maintaining the tannin concentration in said solution by thereafter adding tannin as needed to replace that lost by hydrolysis.

2. A process for producing ammonium sulphate crystals as defined in claim 1 characterized by the tannin in said solution being maintained at a concentration of at least .001 percent of said solution.

3. A process for producing ammonium sulphate crystals as defined in claim 2 characterized by said tannin concentration being maintained in a range of from .001 percent to .005 percent of said solution.

References Cited in the file of this patent

UNITED STATES PATENTS

| 1,697,543 | Seidler | Jan. 1, 1929 |
| 2,516,420 | Robinson | July 25, 1950 |

OTHER REFERENCES

Howes: "Vegetable Tanning Materials," Butterworth's Scientific Publications, London, 1953, pages 2–8 and 16–20.